United States Patent
Collard et al.

(10) Patent No.: US 6,545,769 B2
(45) Date of Patent: *Apr. 8, 2003

(54) DIGITAL COPYING APPARATUS WITH A PERSONAL DATA STORAGE SYSTEM

(75) Inventors: René F. A. Collard, Gennep (NL); Peter J. H. M Teeuwen, Maasbree (NL); Monica M. W. M. Roosen, Venlo (NL); Robertus C. W. T. M. van den Tillaart, Gemert (NL)

(73) Assignee: Océ-Technologies B.V., Ma Venlo (NL)

(*) Notice: Subject to any disclaimer, the term of this patent is extended or adjusted under 35 U.S.C. 154(b) by 152 days.

This patent is subject to a terminal disclaimer.

(21) Appl. No.: 09/725,911

(22) Filed: Nov. 30, 2000

(65) Prior Publication Data

US 2001/0000027 A1 Mar. 15, 2001

Related U.S. Application Data

(62) Division of application No. 09/272,556, filed on Mar. 19, 1999.

(30) Foreign Application Priority Data

Mar. 19, 1998 (NL) .............................................. 1008642

(51) Int. Cl.⁷ ............................. B41B 19/00; B41F 1/00; G06F 15/00; G06K 1/00
(52) U.S. Cl. .................... 358/1.16; 358/1.16; 358/1.17; 358/404; 358/523; 358/444; 358/400; 358/500; 358/1.1
(58) Field of Search ............................... 358/1.16, 1.17, 358/404, 523, 444, 400, 500, 1.1

(56) References Cited

U.S. PATENT DOCUMENTS 5,018,060 A * 5/1991 Gelb et al. .................. 707/205
5,068,888 A   11/1991 Scherk et al.
5,394,534 A * 2/1995 Kulakowski et al. ....... 711/112
6,192,165 B1 * 2/2001 Irons .......................... 382/306

FOREIGN PATENT DOCUMENTS

| EP | 0689157 A2 | 12/1994 |
| EP | 0756414 A2 | 1/1997 |

* cited by examiner

Primary Examiner—Edward Coles
Assistant Examiner—Ashanti Ghee
(74) Attorney, Agent, or Firm—Birch, Stewart, Kolasch & Birch, LLP

(57) ABSTRACT

A digital image reproduction apparatus including a scanner unit, a printer unit, a memory, an operator control unit integrated in the apparatus and provided with an input device and a display for the user to give operator control commands to the apparatus, a network connection unit for coupling to a network for the purpose of communication with a digital external environment including at least a number of workstations of users, a management unit connected to the scanner unit, printer unit, memory and network connection unit, and, via the network connection unit, to the workstations, which management unit maintains logic storage spaces in the memory, each allocated to a specific user. The management unit, when receiving from a said user's workstation a digital data file for printing, stores the file in the logic storage space of the relevant user and passes it for printing to the printer unit only on a command from the operator control unit, which command identifies the relevant file, and also, on receipt from the operator control unit of an order for scanning, such job being provided with a user identification, stores the data generated by the scanner unit in the logic storage space of the relevant user and passes it to a workstation of the relevant user only on a command from the latter workstation, which command identifies the relevant file. Other files, such as sets of adjustment parameters for printing or scanning processes, can also be stored in the logic storage spaces.

16 Claims, 15 Drawing Sheets

DIGITAL COPYING APPARATUS WITH A PERSONAL DATA STORAGE SYSTEM

This application is a divisional of application Ser. No. 09/272,556, filed on Mar. 19, 1999, the entire contents of which are hereby incorporated by reference.

BACKGROUND OF THE INVENTION

1. Technical Field of the Invention

The invention relates to a digital image reproduction apparatus including a scanner unit, a printer unit, a memory, and an operator control unit integrated in the apparatus, the operator control unit being provided with an input device and a display that permit a user to give operator control commands to the apparatus. The invention further relates to such a digital reproduction apparatus that includes a network connection unit for coupling to a network for the purpose of communication with a digital external environment having at least a number of workstations of users, and a management unit connected to the scanner unit, printer unit, memory and network connection unit, and, via the network connection unit, to the workstations.

2. Description of Related Art

Reproduction apparatuses of the kind described above are generally known. Such apparatuses can be used for copying documents and for printing digital image data files made in a workstation.

Scanner devices are also known which are coupled to a network and which can send digital data files generated during scanning to a pre-programmed address on the network, usually a workstation of a user.

A network is provided with one or more fileservers which provide interim storage and retention of the digital data if a destination address does not answer because the apparatus connected thereto is not ready for reception or possibly not even switched on. A data file is thus first sent from the dispatch address via the network to the fileserver and then from the latter to the destination address.

A number of problems can arise with such conventional systems, particularly if the files sent are large. First of all, a file is sent over the network twice so that the load on the network and the file server is relatively large. Secondly, if an apparatus coupled to a reception address is not ready for reception, the files are stored on the file server disk, which can thus fill up, so that the functioning of the entire network is obstructed or even made impossible. Thirdly, in a scanning process, when the disk of the receiving workstation becomes full, the scanning process has to be terminated, and this obstructs the progress of the work.

In addition, data traffic monitoring by the owner of the data files may be inadequate, on the one hand because print files are printed immediately even if he is not present, and secondly scan files are immediately available at his workstation even if he is not present.

It is therefore desirable to more effectively monitor the traffic of digital image data from and to the reproduction apparatus so that the above problems are eliminated or at least so reduced that they do not obstruct the functioning of the entire digital network.

SUMMARY OF THE INVENTION

To this end, in the apparatus according to the invention, the management unit maintains logic storage space in the memory, each allocated to a specific user, wherein the management unit, when receiving from a said user's workstation a digital data file for printing, stores the file in the logic storage space of the relevant user and passes it for printing to the printer unit only on a command from the operator control unit, which command identifies the relevant file, and also, on receipt from the operator control unit of an order for scanning, such order being provided with a user identification, stores the digital data generated by the scanner unit in executing the job in the logic storage space of the relevant user and passes it to a workstation of the relevant user only on a command from the latter workstation, which command identifies the relevant file.

In this way, data traffic between the digital environment and the apparatus is decoupled in time. This means that a permanent coupling between the making and sending of a file for processing, and the processing of that file, is eliminated, and the files are kept in a safe place in the apparatus, this place being coupled or otherwise associated with a particular person, until they are actively called up from the destination address. This means that the user, when making or sending files, need not be concerned with the time and circumstances of the processing of his files.

In addition, the owner of a file retains control thereof, because its transport takes place only in his presence at the reception point. The buffer point can also be secured so that only the owner of the buffer can access the files stored therein.

The term "user" in this context also includes an application program or (the control program of) a peripheral, if such a program is aimed at generating or processing a data file.

It should also be noted that the term "workstation of a user" means a workstation running a program personalized for that user.

It should be noted that Applicants' patent application EP-A 0 689 157 already describes a printing apparatus which never directly prints a print file received from a digital environment, but stores it internally under the owner's name and does not print it until a command for this purpose is given from the apparatus operator control panel, said command identifying the file. The idea of storing a print file and only releasing it on a specified command is now expanded in the present invention to a concept of logic storage spaces accessible only to the relevant user, in which not only print files, but also all kinds of other files, primarily scan files, can be stored, but always in such manner that a stored file has to be actively brought up from its destination from a logic storage space of this kind.

Particularly for scan jobs this concept of logic storage spaces in the apparatus has the advantage that a file is sent over the network just once and hence subjects the network and the file server to less loading. In addition, scan files remain in the apparatus until a user brings them up to his workstation. If so many digital data are generated that the disk becomes full, that disk is the apparatus disk (the memory). As a result this disk may break down, but that does not obstruct the action of the file server and the network, so that in any case the communication between the users of the network is not obstructed. Finally, the problem of the limited storage capacity of the workstation is effectively solved, because the user will only bring up as many files as his workstation can process, and he can leave the rest waiting in the apparatus memory.

Other files which can be kept in the logic storage spaces are sets of settings of parameters for controlling the apparatus which have been made by the operator on the operator control panel prior to a printing or scanning process. These can be made by means of the operator control panel or by means of a special program running on a workstation, stored in the personal logic storage space of the user, and be brought up therefrom to control the apparatus.

The logic storage spaces may have the form of a directory structure in the memory, but also, for example, the form of entries in a database. Of course the management unit which manages the logic storage spaces is provided with an administration system for the logic storage spaces and their contents.

According to one embodiment of the apparatus according to the invention, the management unit, on receiving from a workstation a digital data file for printing, such file being provided with a user identification, checks whether it already manages a logic storage space for the relevant user, and if that is not the case, the management unit creates a logic storage space for the relevant user and stores therein the received digital data file. The creation of logic storage spaces can also take place in response to a program start up at a workstation intended for communication with the apparatus and reporting to the management unit on start-up.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BREIF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
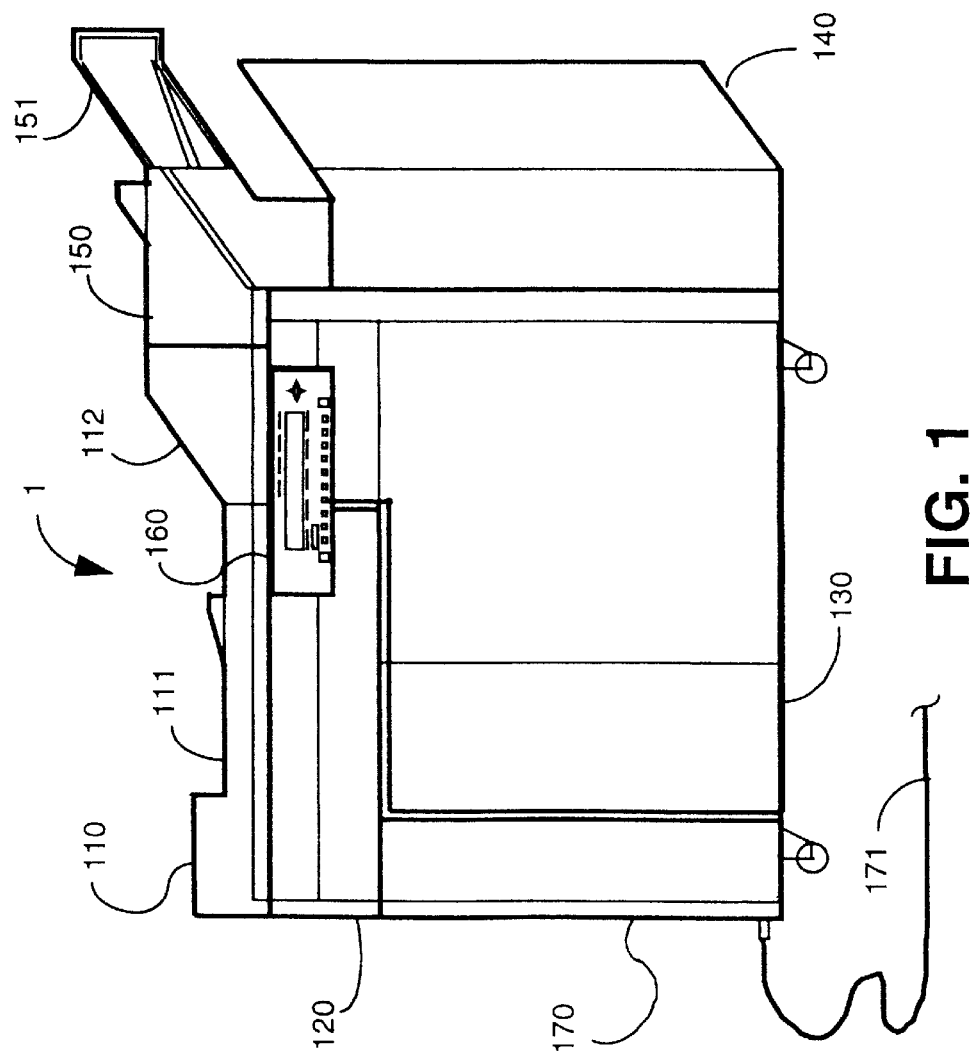
FIG. 1 illustrates an apparatus according to the invention.

FIG. 1 shows the apparatus according to the invention, on which the different parts are separately shown in diagram form.

The document feeder 110 is provided with an input tray 111 for the introduction of a stack of documents, a transport mechanism (not shown) for transporting the documents one by one along the scanner unit 120, and a delivery tray 112, in which the documents are placed after scanning.

The scanner unit 120 includes a flat bed scanner provided with a glass platen on which an original document can be placed, a CCD array and an imaging unit having a movable mirror and lens system for imaging the document on the CCD array. In these conditions, the CCD array generates electrical signals which are converted into digital image data in manner known per se.

The printer unit 130 includes an electro-photographic processing section known per se, in which a photoconductive medium is charged, exposed via an LED array in accordance with digital image data, and is developed with toner powder, whereafter the toner image is transferred and fixed on an image support, usually a sheet of paper.

A stock of image supports in different formats and orientations is available in the supply section 140.

The image supports with the toner image are transported to the finishing and delivery section 150, which if necessary collects them into sets and staples them and then deposits them in the delivery tray 151.

An operator control panel 160 is provided on the apparatus for operation thereof. It is provided with a display and keys and is connected to an operator control unit (not shown here).

The control electronics are shown diagrammatically by reference 170. A cable 171 connects this section of the apparatus to a local network 10 (not shown here).

Figure 2:
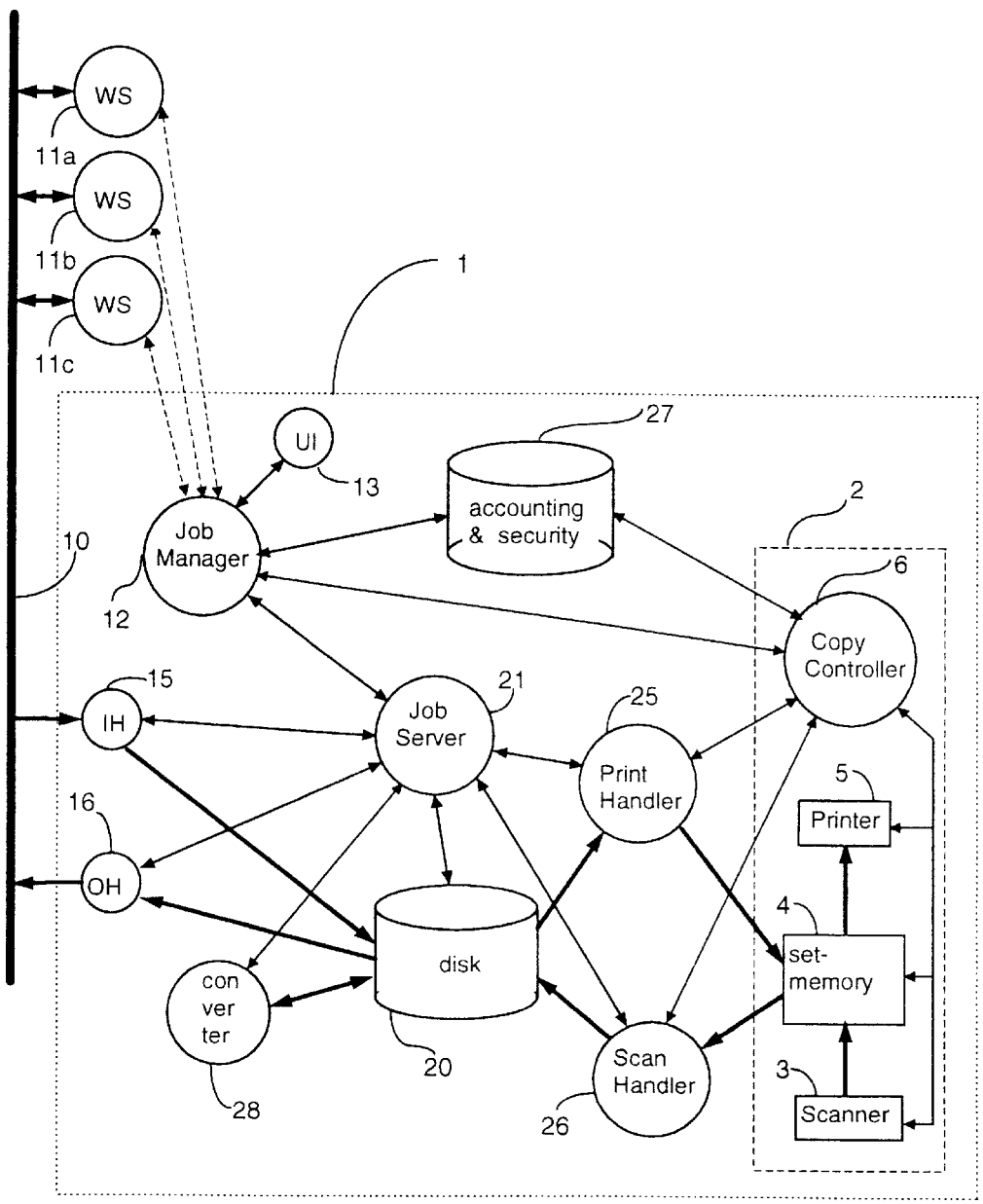
FIG. 2 is a diagram showing the constituent parts of an apparatus according to the invention.

FIG. 2 is a diagram showing the constituent parts of the apparatus according to the invention.

The apparatus 1 comprises a basic unit 2 which contains a scanner unit 3, a printer unit 4, a set memory 5 and a control unit 6 for these units, hereinafter termed the Copy-Controller.

The basic unit 2 contains the units and functions required for making a simple copy. During the scanning of an original document, the scanner 3 generates digital image data and stores them in the set memory 4, whereafter the printer 5 reads out the image data from the set memory 4 and prints them on an image support, usually a sheet of paper. This process is controlled by the CopyController 6. The set memory 4 in this description also includes an image processing function, although this is not essential to the present invention and is therefore not explained further.

The apparatus 1 also includes a number of units required to print digital image data which are fed via a local network 10 from a digital environment, and for exporting digital image data generated by the scanner 3 to the digital environment via the same local network 10.

The term "digital environment" as used here denotes one or more workstations 11a, 11b, 11c, on which a program is operative for communication with the apparatus according to the invention, and which are also connected to the local network 10.

The apparatus 1 is provided with:
a management unit 12, hereinafter referred to as the: JobManager, which manages the processing processes and also updates an administration system for all the copying, scanning and print jobs present,
an operator control unit 13, also termed a: UserInterface (UI), provided with an operator control panel on the apparatus housing, with a display and keys for operation of the apparatus 1, an InputHandler 15 for receiving and transmitting digital data reaching the apparatus via the network 10 from the digital environment and an OutputHandler 16 for sending digital data via the network 10 to the digital environment, a storage unit 20 formed by a high-capacity hard disk, a unit 21 hereinafter referred to as a JobServer for managing the data files on the storage unit 20 and for controlling the processing processes, a control unit 25 hereinafter referred to as a PrintHandler, which is dedicated to providing a printing process, and a control unit 26 hereinafter referred to as a ScanHandler, which is dedicated to providing a scanning process, an accounting and security unit 27, which inter alia manages the authorization of users and access codes, p1 a conversion unit 28 for converting digital data files to different formats.

FIG. 2 shows control connections by means of thin arrows and data transport connections by means of thick arrows.

The JobManager 12 is connected to the operator control unit 13, the JobServer 21, the CopyController 6, the accounting and security unit 27 and, via the network 10 and the InputHandler 15 and OutputHandler 16, to the workstations 11*a*–*c*. The latter connection is indicated diagrammatically by direct broken-line arrows. Apart from being connected to the JobManager 12, the JobServer 21 is also connected to the storage unit 20, the InputHandler 15, the OutputHandler 16, the PrintHandler 25, the ScanHandler 26 and the conversion unit 28. The CopyController 6 is connected to the scanner unit 3, the set memory 4 and the printer unit 5, and also to the JobManager 12, the PrintHandler 25, the ScanHandler 26 and the accounting and security unit 27.

Digital data files which are sent to the apparatus 1 via the network for printing are either of a first type or a second type. Files of the first type are required to be printed directly, i.e. without further action on the part of an operator at the apparatus, while files of the second type are required only to be stored in the memory of the apparatus and not to be printed until an operator explicitly so requests at the apparatus by selecting via the operator control panel. The type of file involved is apparent from an attribute added to the file.

Processing of a data file of the first type is referred to in this description as automatic printing (AP).

Processing of a data file of the second type is referred to as interactive printing (IP). The procedure with this is as follows (see FIG. 2).

A second type data file for printing sent by a workstation via the network is received by the InputHandler 15. The latter extracts from the file a number of predetermined identification data and passes such data to JobServer 21, which in turn transmits the data to JobManager 12. In this example, the extracted identification data include the name of the owner and the name of the file itself. The file is then stored unchanged in the storage unit 20, whereafter the apparatus passes into the standby mode.

JobManager 12 manages an administration system in which the identification data of all the data files for printing stored in the storage unit 20 are entered. If a new file is supplied via the network, then the JobManager 12 adds the identification data thereof in connection with the name of the owner/sender to the administration system.

The storage unit 20 together with the administration system of the JobManager 12 form, as it were, a set of "logic storage spaces" for data files, each logic storage space being allocated to one user. Thus in actual fact storage in the user's logic storage space means that the file is stored in the storage unit 20 and entered in the administration system in connection with the name of that user. A logic storage space can be protected by a code specific to the owner/user, and in practice this means that an operator can only obtain information concerning the files stored in a specific logic storage space after he has input this code.

There can also be one or more logic storage spaces for general use which are not protected by a code, so that everyone has access to that logic storage space. All kinds of files used by numerous users, for example specific forms, can be stored in a public storage space of this kind.

The manager of the apparatus can set the JobManager 12 so that it does not accept any print jobs which are required to be printed immediately (files of the first type or AP). In that case, the JobManager automatically converts such jobs into interactive print jobs (IP) and stores the data file in storage unit 20 in the form of files of the second type.

When an operator wants to have a specific data file of the second type printed, he must give a command for this via the apparatus operator control panel 160. In response to this, the data file is brought out of the storage unit 20 and converted to printable data by the PrintHandler 25, and after intermediate storage in the set memory 4 the data are processed by the printer unit 5 to produce a print. A print file of the second type can be protected with a code by the sender. This code has the form of an attribute to the print file. If a user wants to print this file interactively, he must input the security code on the operator control panel before the file is printed.

When a data file of the second type has been printed, it remains in principle stored in the storage unit 20 until it is removed by the user himself or the manager of the apparatus. To this end, he gives a command for removal of a selected file. In response to this the JobManager 12 passes a command to the JobServer 21 to erase the intended file from the storage unit 20 and it removes the identification data of that file from its administration system.

Figure 3:
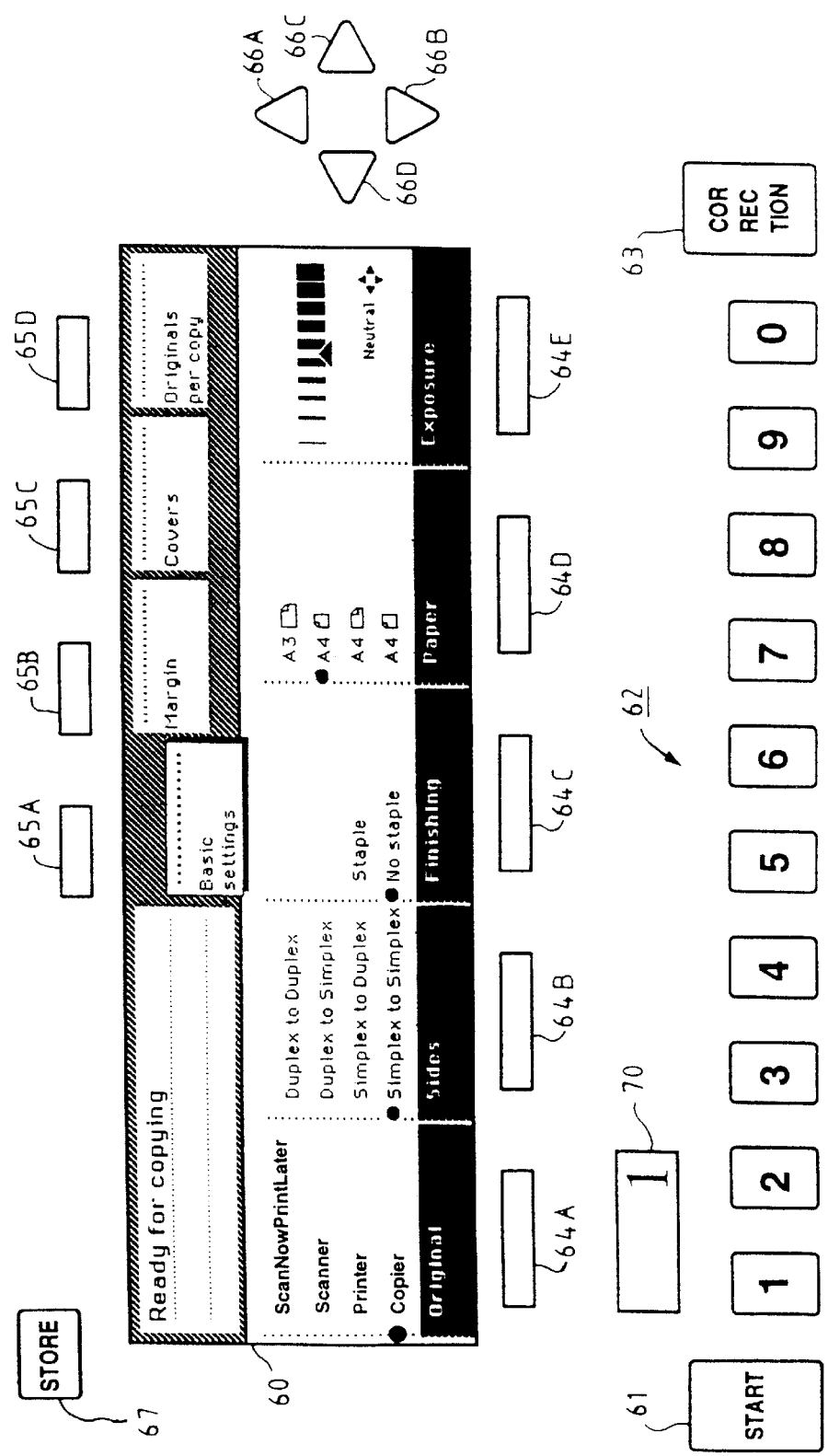
FIGS. 3 and 4 illustrate an apparatus operator control panel, according to the invention, in various situations.

The operator control panel 160 belonging to the operator control unit 13 is shown in FIG. 3 and includes a display screen 60, such as an LCD display, and a number of keys, namely a start key 61, number keys 62, correction key 63, storage key 67 and selection keys 64A–E, 65A–D and the key cluster 66A–D. All these elements are connected to the operator control unit 13, which in response to operation of the keys passes signals to the JobManager 12 and which also controls the display screen 60 to display options and messages to the operator.

When the apparatus has been switched on, the display screen 60 displays an image formed by a number of vertical columns, each situated above one of the selection keys 64A–E. Each column relates to a specific basic function of the apparatus and shows the different possible settings for that basic function. For example, the furthest left column is allocated to the choice between a copying function, in which a document is scanned by the scanner and then reproduced, a printer function for interactive printing, in which a print is made using a data file of the above-mentioned second type sent using the network for printing, a scanner function, in which a document is scanned while generating a scan file that can then be fetched by a workstation, and a deferred copying function ("scan now-print later"), in which a document is scanned while generating a print file of the second type which is stored in the storage unit of the apparatus and can be printed with the printer function. The setting selected at any time, the copying function in this case, is indicated by a marker, such as a dark dot, or by highlighting.

By actuating a selection key an operator can choose a different setting, e.g. in accordance with a cyclic pattern. As a result of a change of a setting the function of one or more of the other selection keys may change, because the old function is no longer relevant and other selection options are required. Different text relating to the new function then appears in the associated column of the display screen 60.

The selection keys 65A–D offer the possibility of bringing up a different set of functions which cannot be displayed by the restricted dimensions of the display screen 60. These are generally functions which are not required for a simple copying or print job, but which offer the operator more options to obtain special printing results. In this example, these functions comprise shifting the margin on the print, adding covers, and originals per copy. The meaning of the keys 65A–D is indicated in an associated field in the display screen 60 directly beneath each key. When one of the keys is actuated the corresponding set of functions is activated and the layout of the display screen 60 is adapted to the associated functions. At the same time, this selection is displayed by framing or otherwise making conspicuous that field on the display screen 60 which belongs to the actuated key of the group 65A–D.

The operator control panel 19 also contains a number display 70 to indicate the number of prints set, as is generally customary on copying machines.

If the printer function has been selected by key 64A in the "basic settings" group, the columns above the keys 64B (simplex or duplex, both in respect of the original document and the copy sheet), 64C (stapling) and 64D (the choice of format of the print paper) relate to the finishing of the copying job and the column above key 64E relates to light/dark control for the copy.

Figure 4:
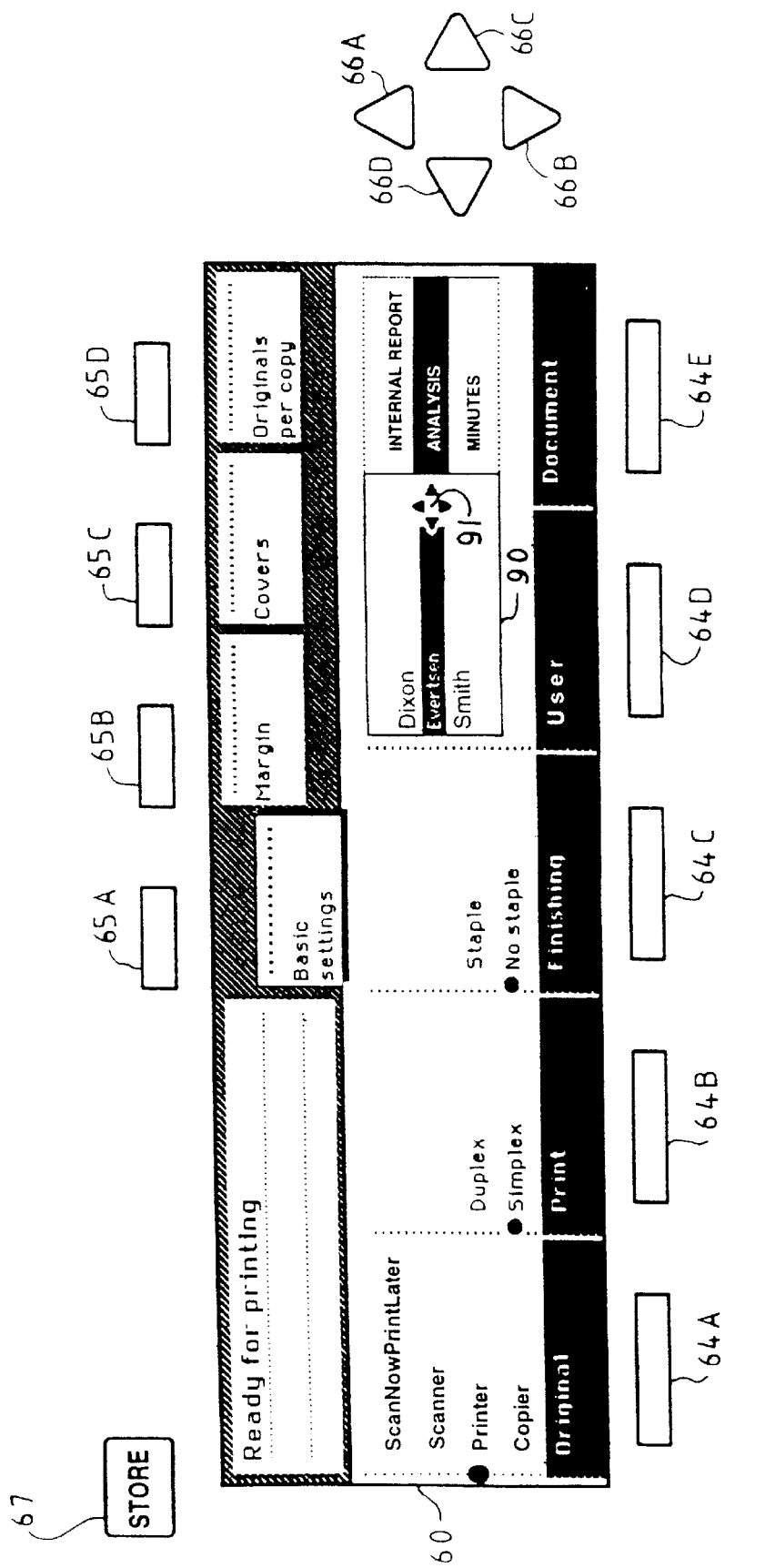

FIG. 4 shows the layout of the display screen 60 after the printer function for interactive printing of data files of the second type has been selected by key 64A in the group "basic settings". In this case the keys 64D and 64E now have the function of specifying the data file for printing by selection of users and file name. Different files of the second type, from different users, may in fact be stored in the memory. All these files are entered in the administration system of the JobManager 12, as described above, and can be displayed on the display screen 60 for selection.

After actuation of key 64D, an operator can select a user name from the list of users who have sent one or more files, and after actuation of key 64E a file name can be selected from the list of files sent by the selected user.

In response to the actuation of key 64D the column on the display screen above this key is provided with a frame 90 and a star symbol 91 to show that a user name can be selected and the star keys 66A–D are active for that selection. As a preselection, the name of the user who last sent a file to the machine is automatically selected as the name.

The pair of keys 66A/B is used to proceed alphabetically through all the user names in the list, forwards with key 66A and backwards with key 66B. If there are more names than can be displayed simultaneously in the frame 90, then as many names as fit within the frame are displayed and the whole list is automatically scrolled through. A bar having text therein in reverse video indicates what name has been selected.

In response to actuation of key 64E, the column of the display screen above that key is provided with a frame and a star symbol in exactly the same way as the procedure on actuation of key 64D as described above, in order to indicate that a file name can be selected and that the star keys 66A–D are active for that selection. The selection with the star keys is exactly the same as to that involved in the selection of a user name. The last file sent is selected, for example, as a preselection.

After selection of a file, the printing process is started by actuating the start key 61.

The operation of the accounting and security unit 27 will now be explained by reference to FIG. 5A and FIG. 5B. This unit both controls access to the copying, scanning and printing, and the accounting for copies, scans and prints made. It has available a database in which an entry can be made for each user by the apparatus manager. For a user, a user code (hereinafter referred to as the "PIN" code) is stored at his user name and a total to which is added the copies and prints made. Each user name also has an authorization code stored to determine the authorization of the relevant user to make use of the apparatus. This can be set up by the apparatus manager, so that access can, for example, be occasionally denied. The authorization can also be automatically denied to a specific user if, for example, a predetermined credit has been used up.

Figure 5A:
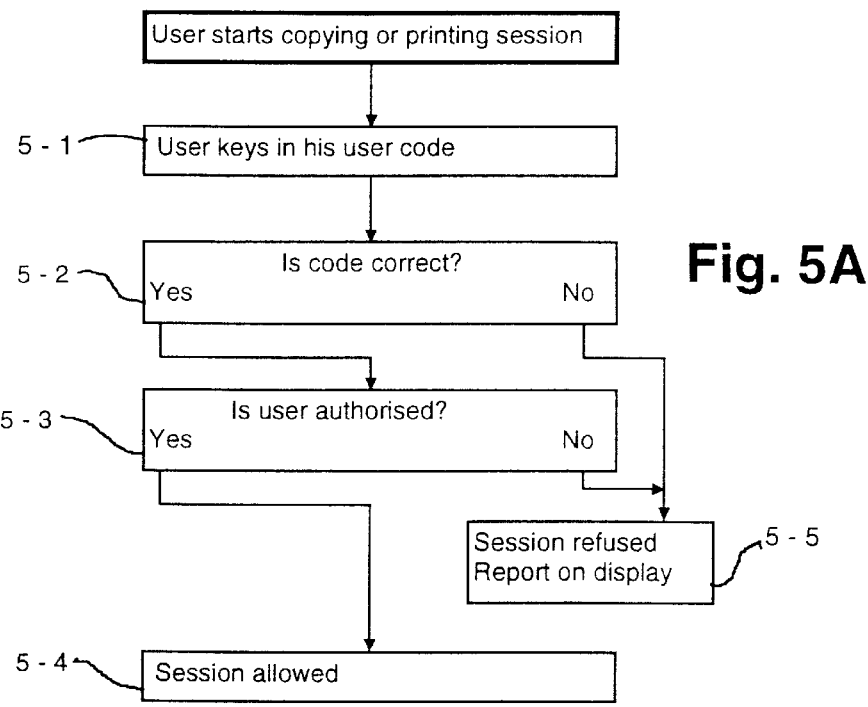
FIGS. 5A and 5B are flow diagrams to explain the operation of the inventive apparatus accounting and security unit.

FIG. 5A describes the case in which a user makes a copy or print at the apparatus. In that case he must first input his user code with the number keys on the operator control panel (5-1). If the code is correct (5-2), the accounting and security unit 27 checks the authorization (5-3). And if this is also in order then the relevant user may make his copies, scans or prints (5-4) and these are added to the user's total usage. If either the user code is incorrect or the user is not authorized, then the unit 27 refuses to release the apparatus for use and reports this on the display on the operator control panel (5-5).

Figure 5B:
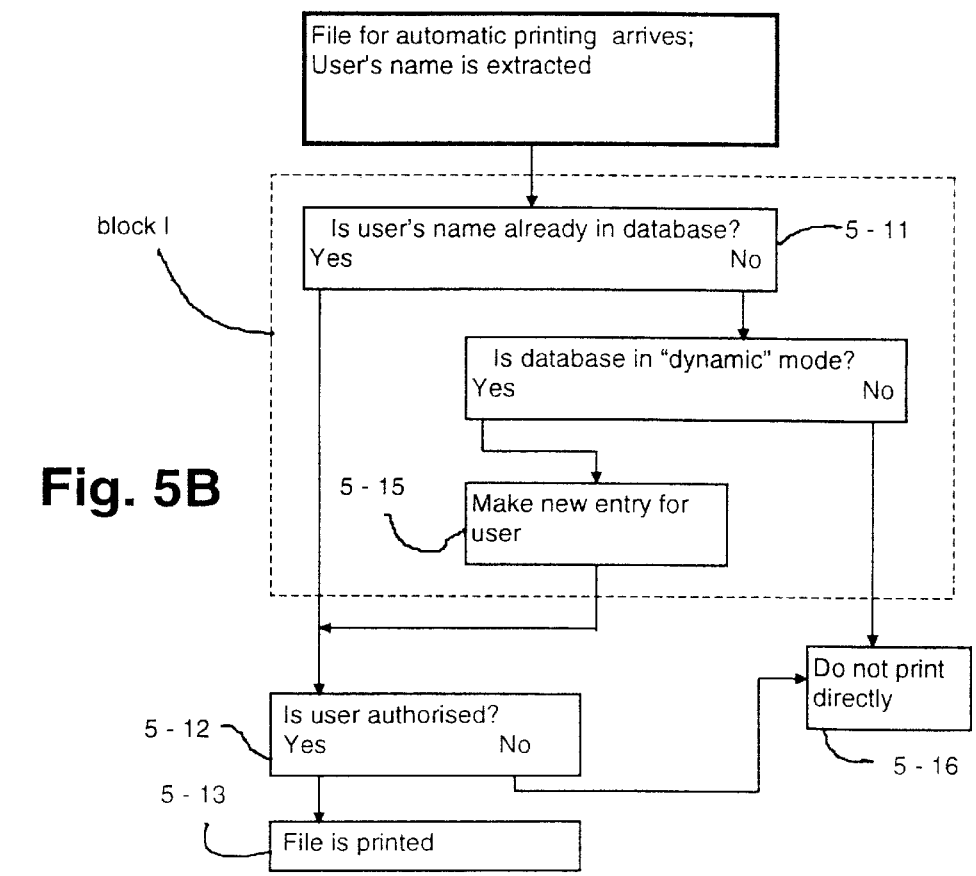

FIG. 5B describes the case in which a user sends a digital data file from his workstation to the apparatus for immediate printing. The task of the accounting and security unit 27 then includes, first, checking whether the user name, which always forms part of the data file, occurs in the database (5-11).

If the database does not contain the user's name for a received print file, then the accounting and security unit 27 makes a new entry in the database (5-15) for this user's name, with an automatic authorization. The mode in which the accounting and security unit 27 does this is hereinafter referred to as the "dynamic mode". It may be that the accounting and security unit 27 has been brought into a different mode, hereinafter referred to as the "static mode", by the apparatus manager, in which case the user's name is not added to the database and the print job is automatically not carried out (5-16). This first treatment is indicated in FIG. 5B in a block I having a broken-line frame.

If the check in block I has a positive result, then the authorization is checked (5-12) and if it is also in order then the print file is processed further (5-13), the prints being added to the user's total usage.

The access system of the accounting and security unit 27 can also be switched off so that anyone can without difficulty copy, scan and, from a workstation, print. In relation to a print job from the operating control panel on the apparatus, the access system remains partially active, namely for protecting individual print files, as will be described hereinafter.

Copying

Figure 6:
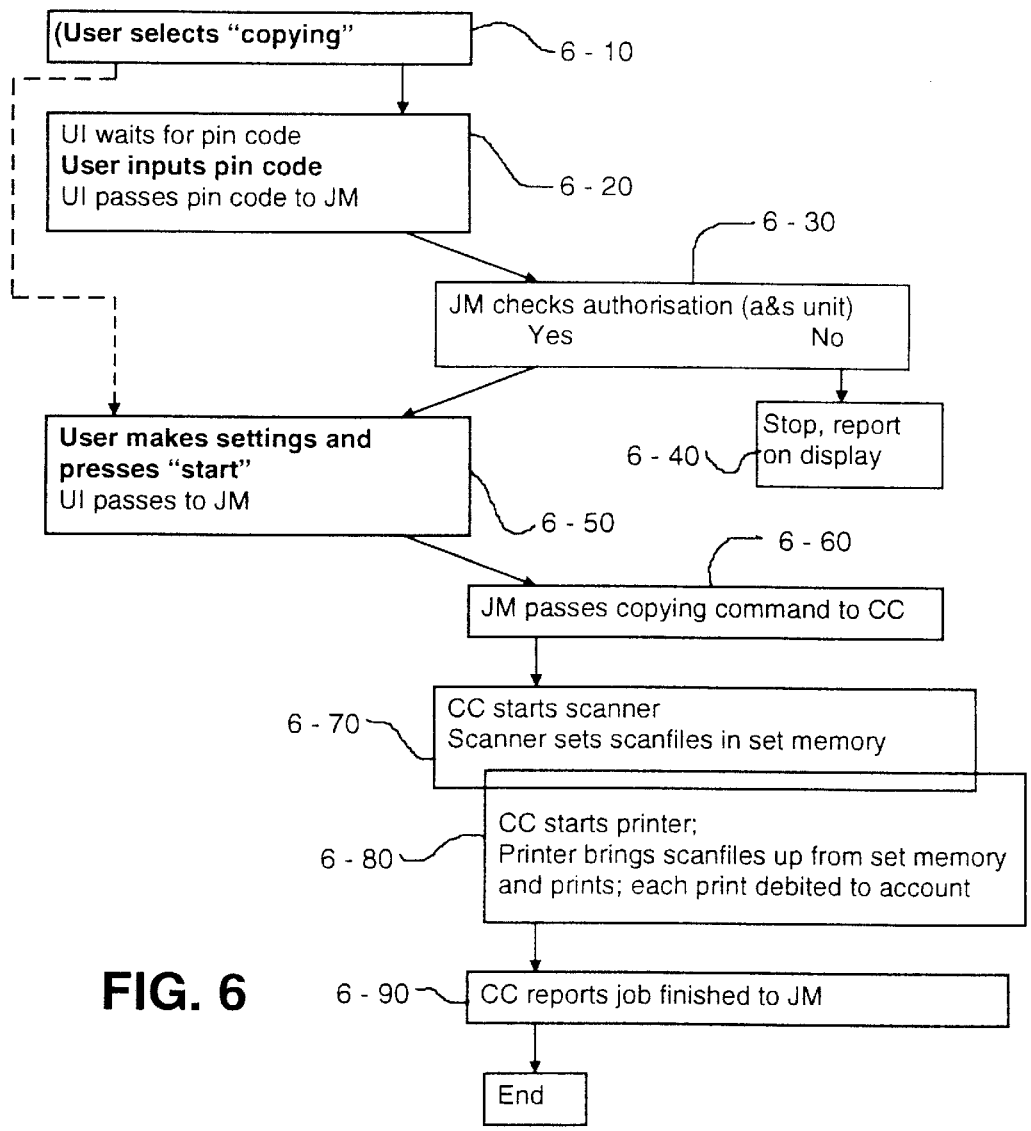
FIG. 6 is a flow diagram of an inventive process for making a copy.

FIG. 6 shows the procedure for making a copy. It is assumed in this case that the access system of the accounting and security unit 27 is switched on.

At the start of the process (6-10), the apparatus is in the "copying" mode or the operator selects that mode with key 64A on the operator control panel 160. The operator control unit 13 now waits for a user code and when the operator inputs this passes it through to the JobManager 12 (6-20). By using the accounting and security unit 27 the JobManager 12 checks the authorization of the relevant user (630). If this is not in order, then the JobManager refuses to make a copy and reports this on the display on the operator control panel 160 (6-40).

If the authorization is in order, then the operator can start copying, by making settings for the process on the operator control panel, placing documents in the input tray 111 of the document feeder 110 and actuating the start key 61 (6-50). The settings and the start command are then transmitted by the operator control unit 13 to the JobManager 12.

If the access system of the accounting and security unit 27 was switched off, then step 6-50 immediately follows step 6-10.

The JobManager 12 then gives a command to the Copy-Controller 6 to activate the various parts of the apparatus (6-60). On the command of the CopyController 6 the scanner unit 3, including the document feeder 110, is now started to scan documents one by one and pass the digital data thus generated to the set memory 4, and the printer unit 5 is started to read the digital data out of the set memory 4 and print them on sheets of paper (6-70 and 6-80).

When all the documents have been scanned and printed, the CopyController 6 reports the job finished to the JobManager 12 (6-90) and the copying action is completed.

Reception of a Print File

Figure 7:
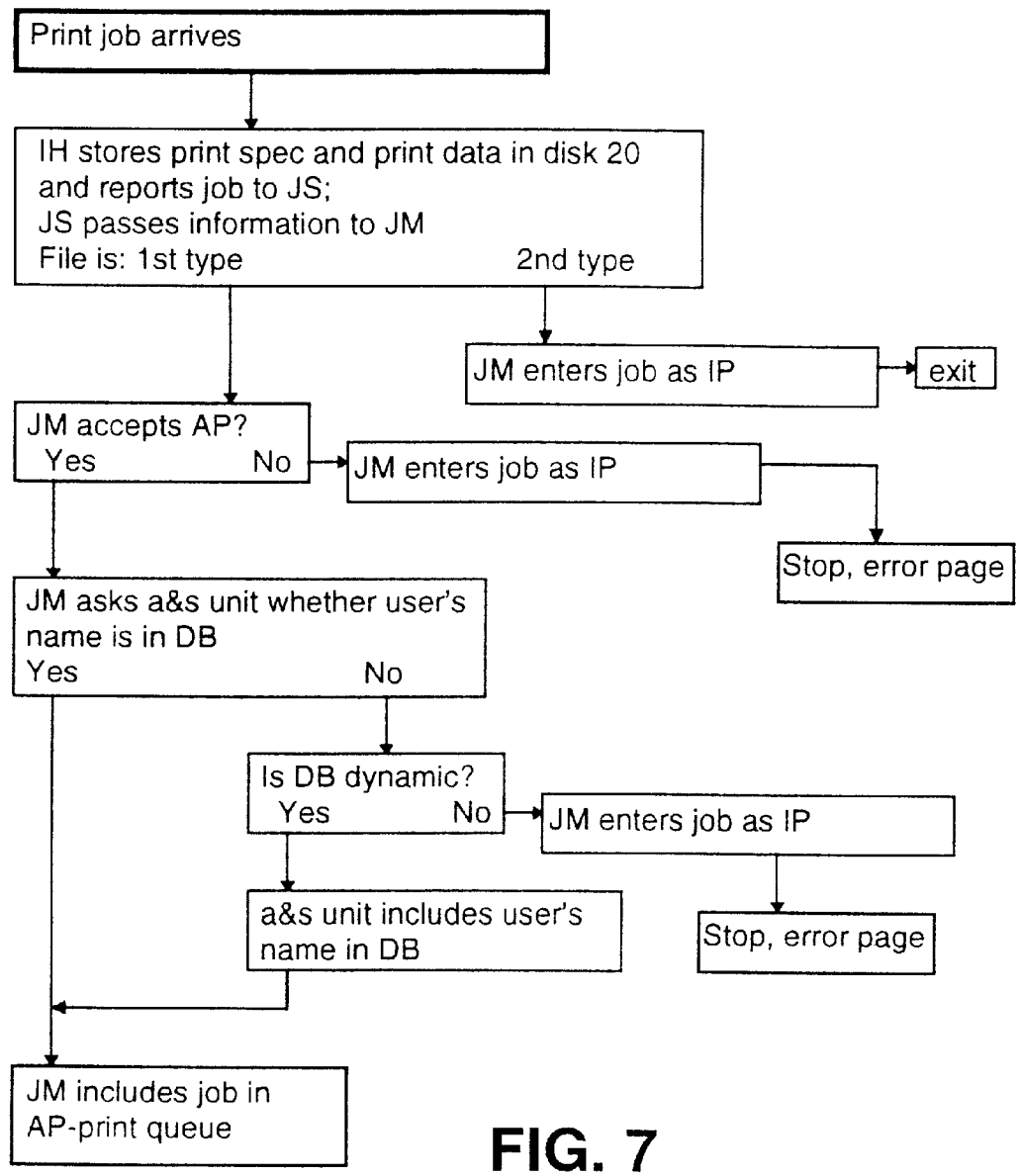
FIG. 7 is a flow diagram of an inventive reception process for print files.

FIG. 7 is a description of the procedure on the arrival, via the network, of a data file of the first or second type for printing The relevant data file is received by InputHandler 15 (7-10). This extracts identification data (including the name of the user and of the file) and print specifications (e.g. printing and finishing parameters), determines whether it is a print file of the first (AP) or of the second (IP) type, reports the job to the JobServer 21 and stores the entire file, i.e. the print specifications and the image data for printing, in the storage unit 20 (7-20). The JobServer 21 in turn reports the job, with the relevant data, to the JobManager 12.

If the print file is of the second type, the JobManager enters the job as such in its job administration system (7-60), whereafter no further activities take place in respect of this job.

If the print file is of the first type, the further handling (7-25) thereof depends on whether the JobManager 12 is in the mode in which it accepts automatic print jobs (AP). If not, the JobManager enters the print job in its job administration system as being an interactive print job IP and does not pass to direct printing (7-65). A print-out can be made, however, giving the reasons why the job has not been carried out (7-70).

If the JobManager 12 is in the mode in which it does accept automatic print jobs, it calls in the accounting and security unit 27 to determine whether the job can be processed (7-30). The accounting and security unit 27 proceeds as described in connection with block I in FIG. 5B. If this check (7-40) shows that the file may not be printed, then the JobManager enters the print job (7-50) in its job administration system as being an interactive print job (IP) and does not pass to direct printing. A message can be printed out on a sheet of paper, however, giving the reasons why the job has not been carried out (7-55).

If the check by the accounting and security unit 27 proves positive, the JobManager includes the job in the print queue (7-35) for automatic print jobs (AP-queue), where it has to wait its turn for processing.

Interactive Printing

Figure 8:
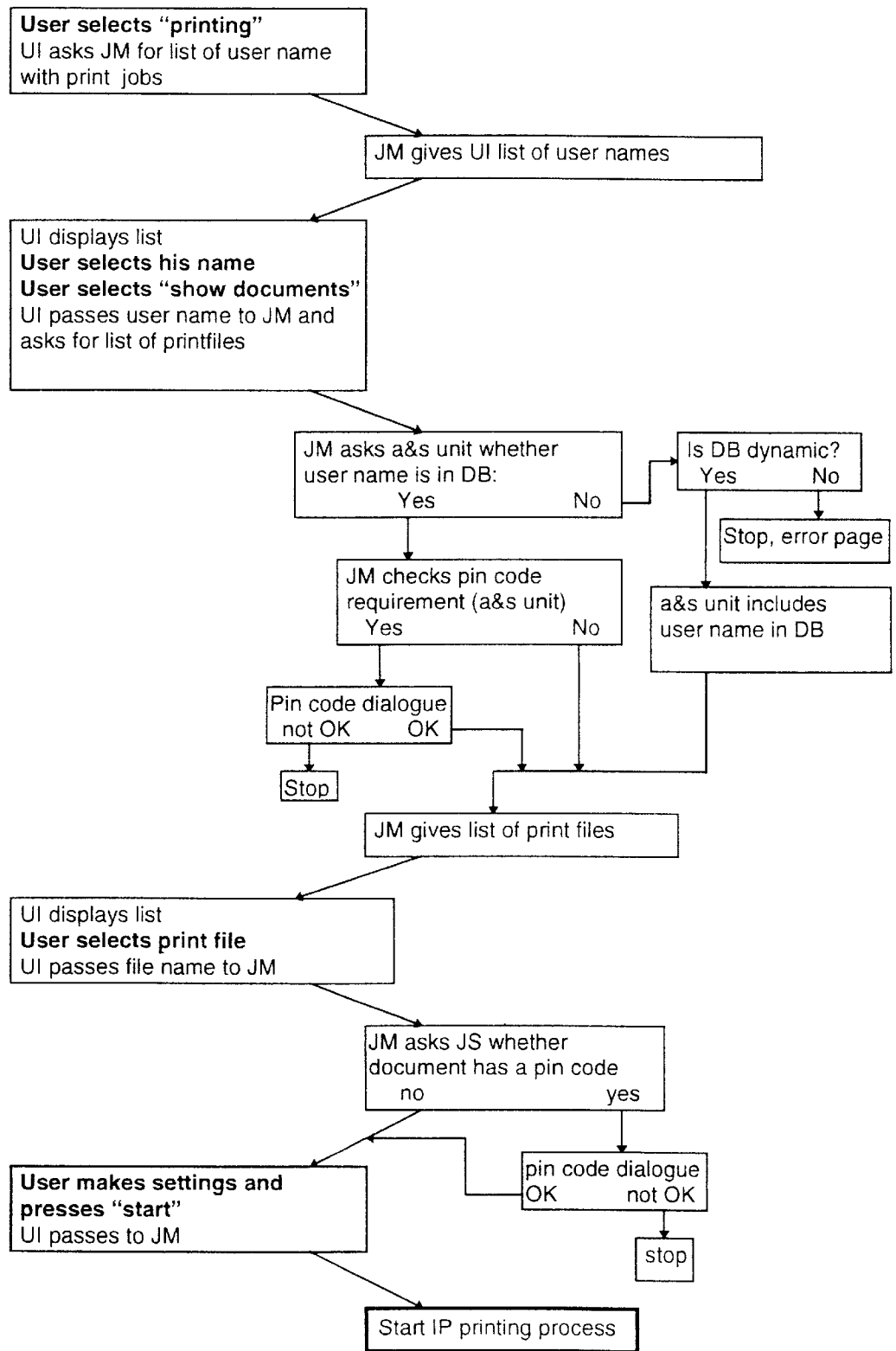
FIG. 8 is a flow diagram of the initial procedure of an interactive printing process according to the invention.

FIG. 8 shows the course of events when a user gives an interactive print order with the aid of the operator control means on the apparatus operator control panel.

The user will start by selecting the print function (8-5) with key 64A (FIG. 3/4). The operator control unit 13 then passes a request to the JobManager 12 to pass a list of all the users who have sent a print job of the second type that has not yet been processed. In response to that request, the JobManager makes up a current list and passes it to the operator control unit 13 (8-10).

The operator control unit displays this list on the display, in the column above key 64D (FIG. 4), whereafter the user can select his name. After the user has done this, he actuates key 64E to obtain an overview of his own print jobs. In response to this, the operator control unit 13 gives the selected user's name and a request for a list of print jobs of that user to the JobManager (8-15).

The JobManager now asks (8-20) the accounting and security unit 27 whether the relevant user's name occurs in its database. The unit 27 then proceeds as described in connection with block I in FIG. 5B. If the name really does occur in the database, the JobManager asks the accounting and security unit 27 whether there is a user's code for this user's name (8-25), and, if so, it conducts a dialogue with the user through the agency of the operator control unit 13 in order to check the user's code (8-30). If the result is positive, the JobManager makes up a current list of interactive print jobs (8-35) of the relevant user and passes it through to the operator control unit 13, which submits this list to the user for selection on display 60.

The user now selects a print file (8-40) the name of which is transmitted by the operator control unit 13 to the JobManager 12, which in turn asks (8-45) the Jobserver 21 whether a security code was sent with the selected file. If so, then through the agency of the operator control unit the JobManager again carries out a dialogue (8-50) with the user to check the code. If the result is positive, the JobManager releases the file for printing, and the user can set finishing parameters on the operator control panel (8-55), whereafter the user can start the printing process (8-60) by actuating the start key 61.

If a user has sent a number of print files each provided with a security code and then wants them all printed interactively, then after a first print file the JobManager in the case of a subsequent print file tries out whether the security code of the preceding protected file is also valid for the current file and will start a new check dialogue with the user only when the current file has a different security code. In this way a user can work faster if he gives a series of print files the same security code. For printing he then only needs to input the code the first time. The use of a single security code is also convenient because the user does not then have to remember a number of different codes.

This procedure is explained by the following example. Let us assume that a user has sent the following series of print files to the apparatus for interactive printing:

File 1, security code 123
File 2, security code 123
File 3, no security code
File 4, security code 123
File 5, security code 456
File 6, security code 456
File 6, security code 123

If the user now selects the files consecutively for printing at the apparatus, he must input the code 123 at file 1, whereafter the JobManager releases the document for printing. File 2 is automatically released because the code of file 1 is also valid for this. File 3 has no security code and is therefore printed without checking. File 4 has the same security code as the preceding protected file, and is therefore automatically released also. Pile 5 has a different security code, and here the user must again input a code, whereafter file 6 is automatically released. Finally, another code has to be input for file 7, because although this security code was used previously, it is not the code of the preceding protected file.

Printing Process

Figure 9:
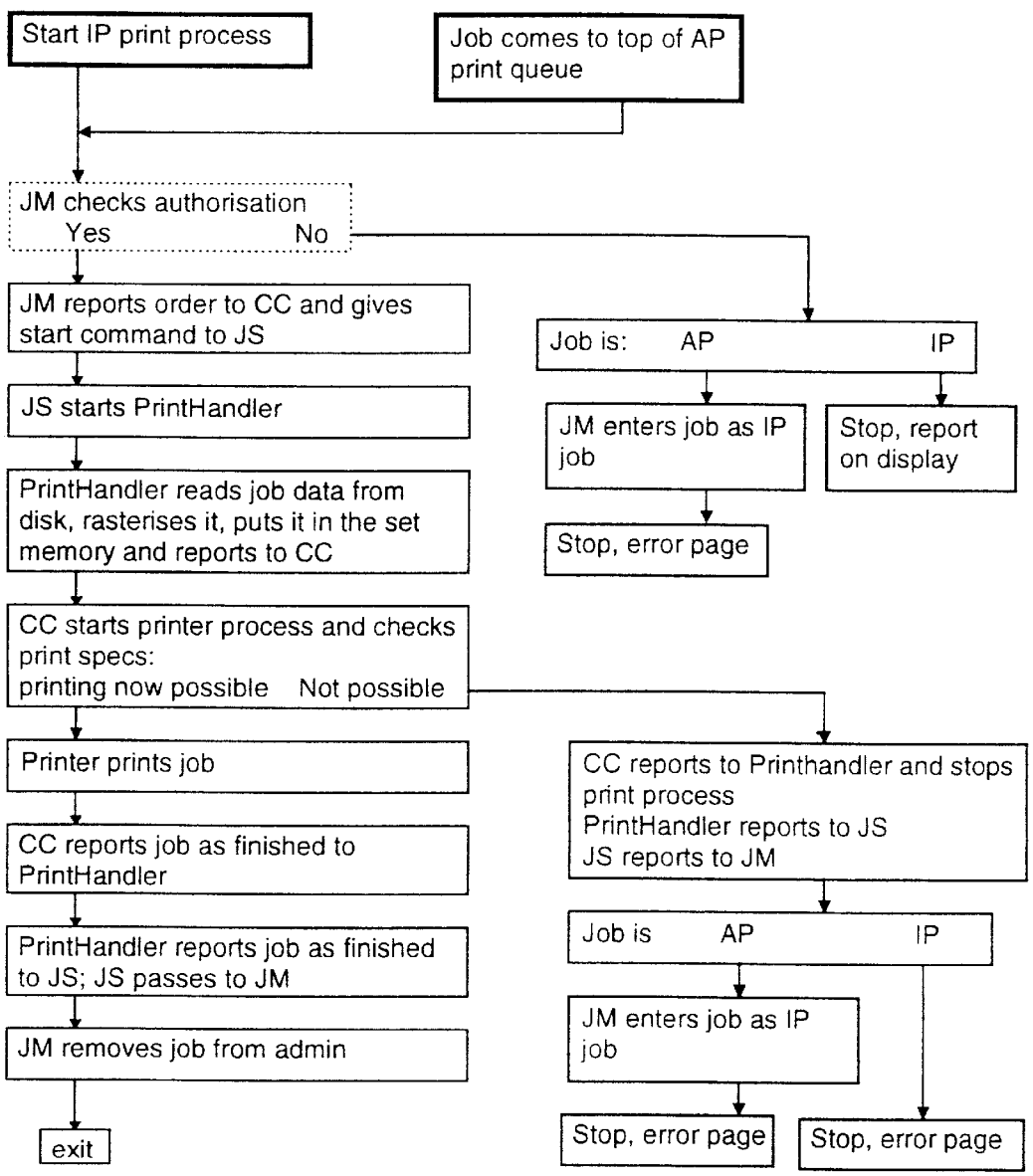
FIG. 9 is a flow diagram of a printing process according to the invention.

FIG. 9 shows the progress of the printing process started either by the JobManager 12 when a print job of the first type (AP) reaches the head of the AP queue (9-5), or by the user as an interactive print job (IP) (9-10). It should be noted here that the JobManager is so programmed as to be able to start an automatic print job only if no activity has been observed on the operator control panel for a predetermined time, e.g. 30 seconds. This prevents a user occupied in a job at the operator control panel from being disturbed by the sudden start of an automatic print job.

If the access system of the accounting and security unit 27 is switched on, the JobManager now first checks the authorization (9-15) of the relevant user (the owner of the print job). If the authorization is not in order, the process is interrupted (9-20). If the print job is an automatic print job, the JobManager records the print file as being of the second type (9-25) and does not print it (9-30). It is possible to make a print giving the reasons why the job has not been carried out. In the case of an interactive print job, the JobManager refuses the order and displays (9-35) a report thereof on the display at the operator control unit 13.

If the user is authorized, the JobManager reports the print job to the CopyController 6 and gives a start command (9-40) for this order to the JobServer, which in turn starts up (9-45) the PrintHandler 25, so that the latter reads the relevant print file from the storage unit 20, rasterizes it, and stores it (9-50) in the set memory 4. On a report from the PrintHandler to the CopyController 6 to the effect that sufficient image data are stored in the set memory, the CopyController starts (9-55) the printer unit 5 to make a print.

In this connection (9-55) the CopyController first checks whether the print specifications belonging to the print job have been satisfied, for example if there is a stock of the required type of image supports (format, orientation, color). If these specifications have not been met, then the job is stopped. The CopyController reports (9-60) this to the PrintHandler, which passes the report through to the JobServer, the latter in turn passes (9-65) it to the JobManager, and the latter reports (9-70), in the case of an interactive print job, the impossibility for printing to be carried out, to the user by a message on the display of the operator control unit 13 or, in the case of an automatic print job, alters (9-75) the description of the job in its administration system to an interactive print job, so that a user can consequently still start the job from the operator control panel at a later moment. Once again a print can be made (9-80) showing the reasons why the job has not been carried out.

If the print job can be processed, the printer unit 5 reads the image data out of the set memory 4, prints them (9-85), and reports (9-90) this to the CopyController 6. When the complete print job has been carried out, the CopyController reports (92) this to the PrintHandler 25, which passes this to the JobServer 21, and the latter in turn to the JobManager 12, which then removes (9-94) the job from its administration system, thus completing (9-96) the printing process.

Scanning

Figure 10:
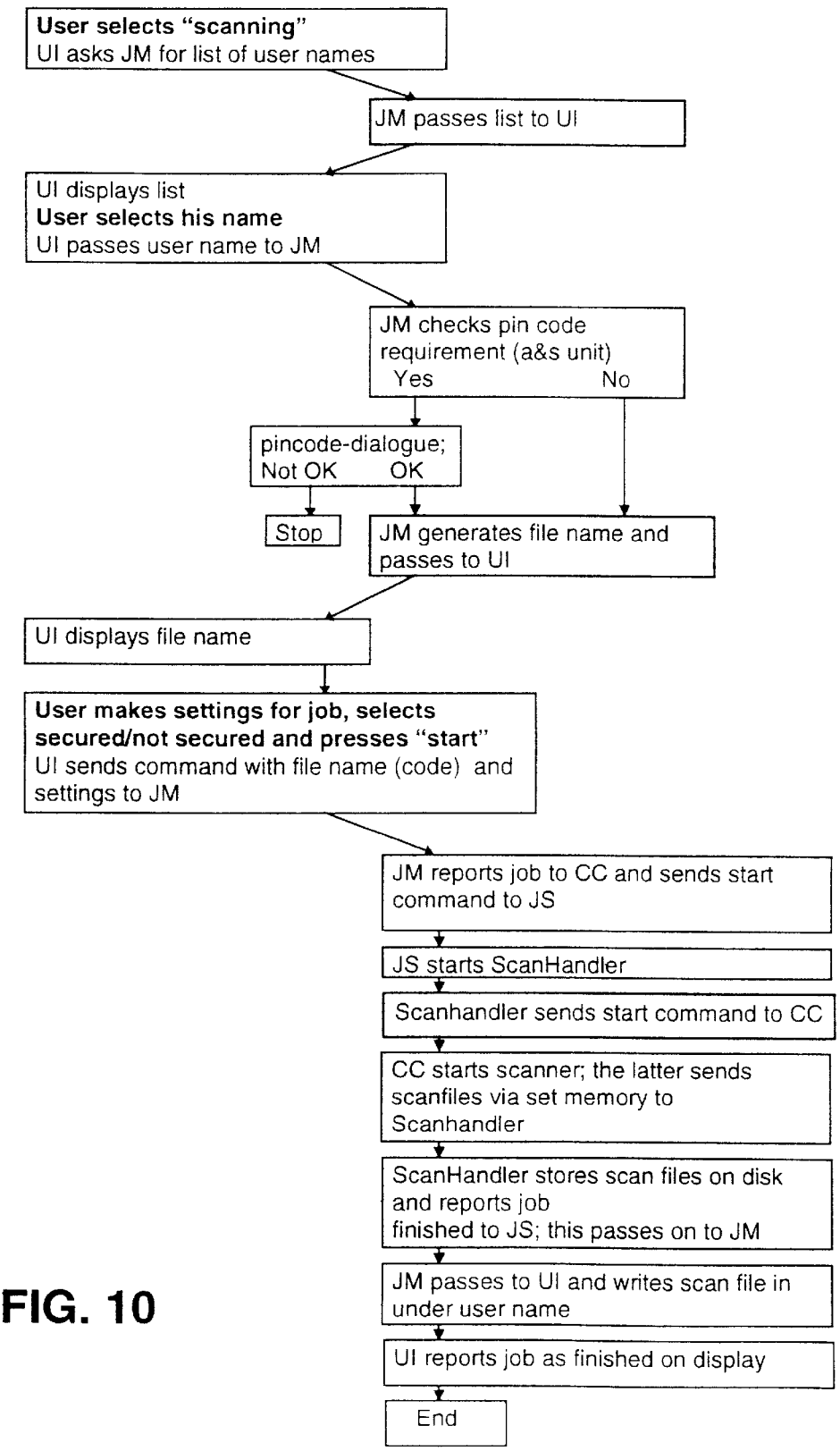
FIG. 10 is a flow diagram of a scan process according to the invention.

FIG. 10 shows the procedure when a user wishes to have a document scanned by the apparatus in order that the digital data generated in these conditions, hereinafter referred to as the scan file, may be further used for processing or storage at his workstation. The scan file in this case is not transmitted to a predetermined address over the network immediately after generation as is usually the case, but is stored in the storage unit 20 of the apparatus, whereafter it must be called up from a workstation. The procedure with this is as follows.

Using the key 64A on the operator control panel of the operator control unit 13 the user selects (10-5) the "scanner" option. In response to this the operator control unit asks (10-5) the JobManager 12 for a list of all the names of users known to the JobManager, i.e.: all the user names in the database of the accounting and security unit 27. As already stated previously, these user names can be entered in the database by the apparatus manager or be automatically added by the accounting and security unit 27 on receipt of a print order from a workstation. Also, when a program intended for communication with the apparatus is started at a workstation this program can automatically be reported to the apparatus JobManager which then ensures that an entry for the user of the workstation is made in the database.

In an alternative embodiment, the user names in the database are provided with an attribute which indicates whether they are authorized to make use of the scan function. In that case the list contains only the names of the authorized users.

Figure 11:
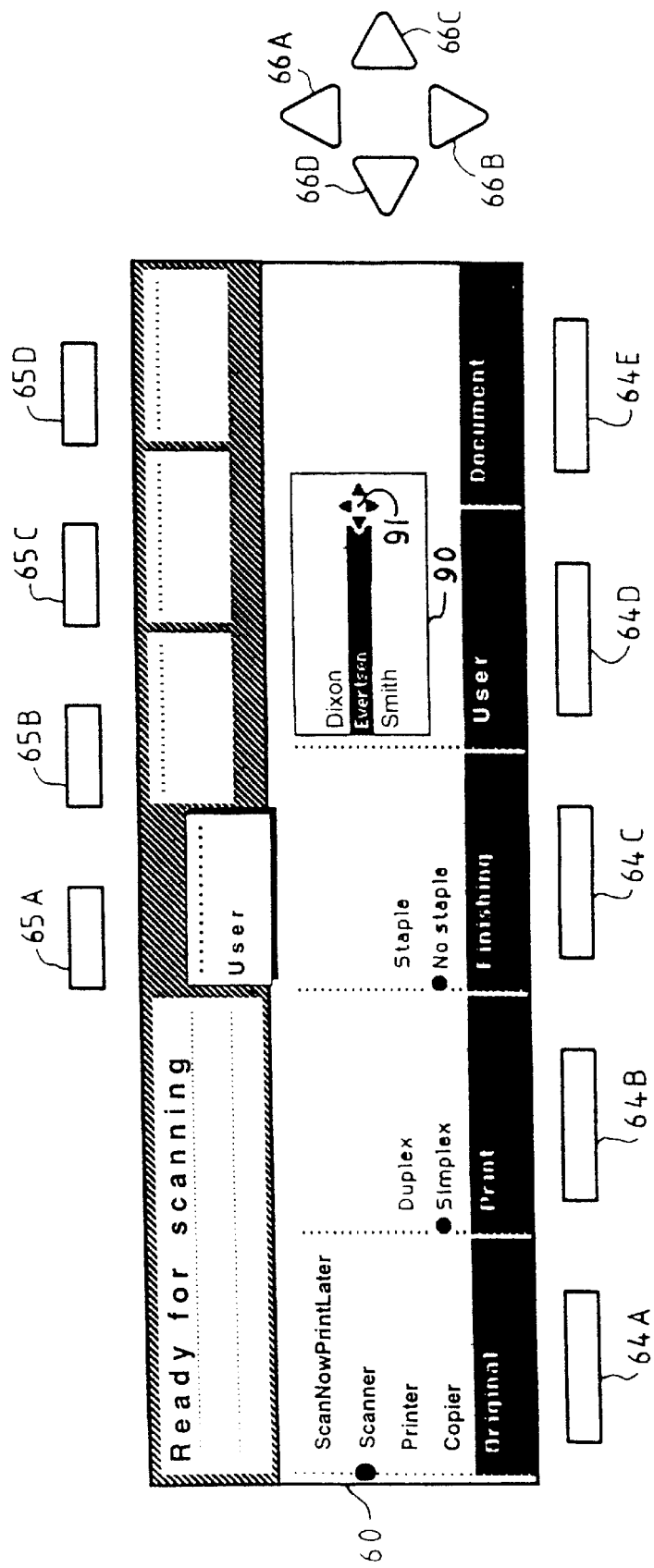
FIG. 11 illustrates the operator control panel according to the invention.

The JobManager passes (10-10) the list of the user names through to the operator control unit 13, which displays (10-15) this on the display 60 for selection by the operator. This is shown in FIG. 11, which illustrates the display 60 after selection of the scanner function.

After the user has selected his name, the operator control unit passes this through to the JobManager 12, which by means of the accounting and security unit 27 then checks (10-20) whether a user code is necessary to obtain access to the scanner function. If that is the case, then by means of the operator control unit 13 it conducts a dialogue (10-25) with the user in order to check his code. In the case of a positive result (10-30), the JobManager releases the scanner function and automatically generates a name for the data file to be made during scanning, and this is passed to the operator control unit 13, which in turn displays (10-35) this file name on the display 60, so that the user subsequently knows the name by which he can find the scan file. This automatically generated name can, for example, have the form: YYYYMMDDhhmmssxxx, which successively shows the year, month, date, hour, minute and second of the scan action, and the serial number of the document in the scanned set.

In addition, the operator control unit now displays in a form similar to the form for selection (10-40) of settings for a copying or printing process (cf. FIGS. 3 and 4), a possible choice for parameters of the scan process, such as the resolution, the format (e.g. TIFF, BMP, etc.), the magnification factor, and whether the original document is to be scanned on one side or both sides. The user can select his settings from this or he can leave the preselected values as they are. The user then places his original documents in the input tray 111 of the document feeder 110 and actuates is the start key 61. In response to this the operator control unit 13 transmits a start command with all the data to the JobManager 12.

The JobManager now reports (10-45) the job to the CopyController 6 and sends a start command to the JobServer 21, which in turns starts (10-50) the ScanHandler 26. The latter transmits (10-55) a start command to the CopyController 6, which controls the scanner unit 3 in order to transport the original documents one by one to the scanner, scan them, and generate scan files. In these conditions the scanner unit counts the number of original pages scanned. The scan files are stored in the set memory 4 and then transmitted (10-60) to the ScanHandler, which stores (10-65) them in the storage unit 20. In addition, the image processing function of the set memory also makes a file with a reduced image of the scanned image, known as a "thumbnail", and this is also stored in the storage unit 20. Thumbnails of this kind are used later for identification in the selection of a scan file.

When all the documents have been scanned, the ScanHandler 26 reports the job as finished to the JobServer, which in turn transmits (10-70) this to the JobManager. The latter passes the finished report (10-75) to the operator control unit 13, which displays it on the display 60 of the operator control panel, together with the number of pages scanned, so that the user can check whether any documents have been skipped. That concludes the scan job.

Scanning with Scan Profile

In a specific embodiment of the apparatus according to the invention, a user can also keep for other scan jobs, settings of scan parameters hereinafter referred to jointly as the scan profile. These parameters are then stored in the storage unit 20 under the user's name in the administration system of the JobManager 12. A scan profile can be brought up later, so that scan jobs can be programmed more quickly. This is described in FIG. 12. The scan profile can also contain an individual name for the scan file made, this name being respected by the JobManager 12 and being used instead of the automatically generated file name, or be combined therewith. This facilitates identification of the file by a user.

Figure 12:
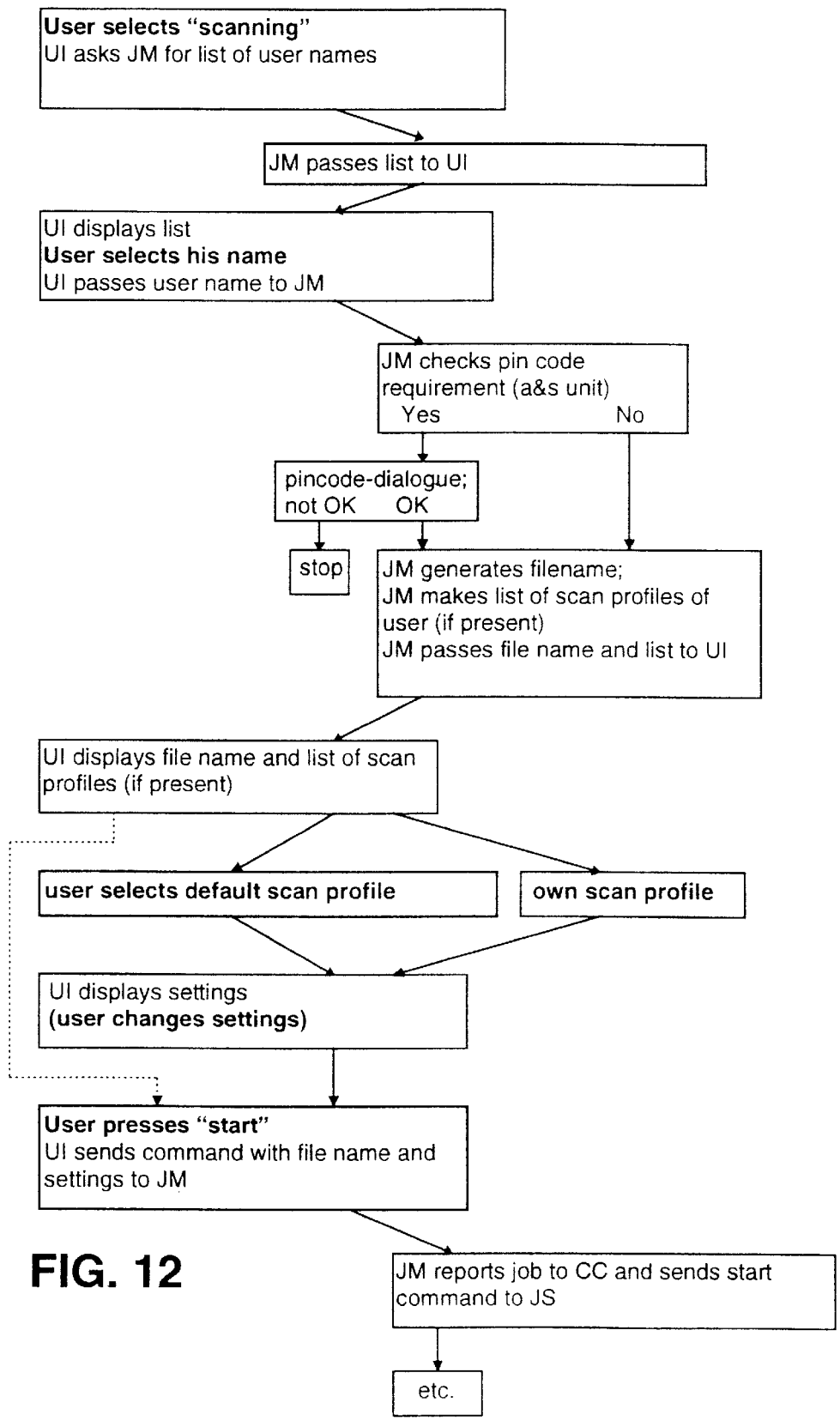
FIG. 12 is a flow diagram of a scan process using a scan profile according to the invention.

FIG. 12 shows the procedure in carrying out a scan job using a scan profile. This differs only in a limited number of points from the procedure described above with reference to FIG. 10. After the JobManager 12 by means of the accounting and security unit 27 has established the fact that a user is authorized (12-5→512-25) to make use of the scanner function and has generated a file name for the job that has just started, it also checks in its administration system whether scan profiles are stored under the name of this user. If so, it makes a list thereof and passes (12-30) it, together with the generated file name, to the operator control unit 13, which displays (12-35) both on the display. Apart from a default profile, one or more profiles for general use can also be added to this list, stored in a public set in the storage unit 20. The reproduction of scan profiles has the same form as that of files for printing in FIG. 4. The default settings have been selected as a preference. The user can now select (1240,12-45) a profile from the displayed list. The selection should be confirmed by actuating the key beneath the selection column, whereafter the operator control unit 13 displays the settings of the selected profile on the display.

Starting from the settings which are then applicable the user can then change (12-50) one or more thereof. If he then actuates the start key 61 (or if he actuates (12-55) the start key without selecting a different profile from the preselected default profile), the operator control unit 13 transmits (12-60) a start command with the applicable settings to the JobManager 12, and the remainder of the procedure is as described with reference to FIG. 10.

Making and Storing the Scan Profile

Figure 13:
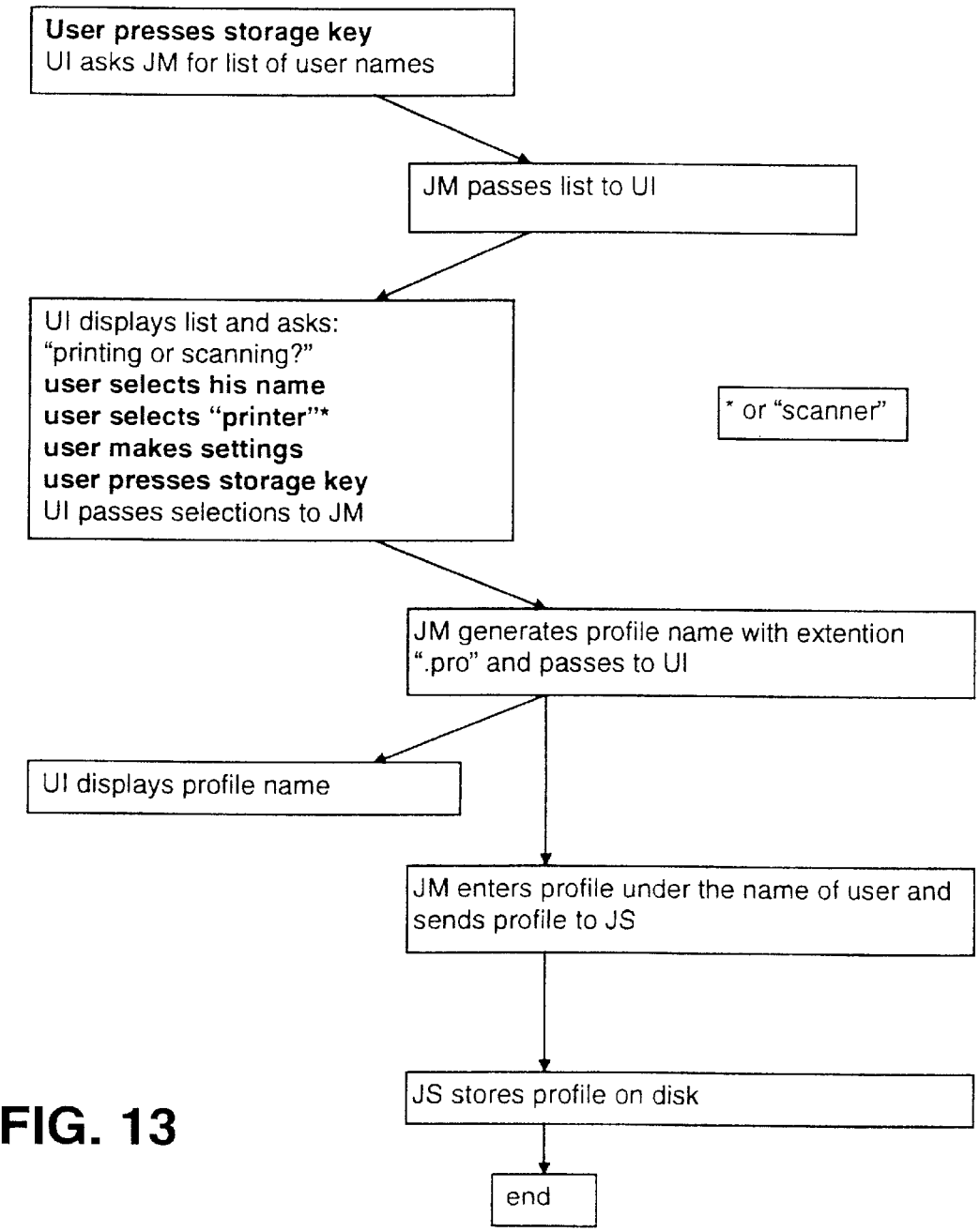
FIGS. 13 and 14 are flow diagrams of a procedure for making a scan profile according to the invention.

FIG. 13 shows the procedure for making and storing a scan profile from the apparatus operator control panel. The storage key 67 is used for this.

In response to actuation (13-10) of the storage key 67, the operator control unit 13 asks the JobManager 12 for a list of all the user names it knows, i.e., all the user names in the database of the accounting and security unit 27.

The JobManager passes (13-20) the list of user names to the operator control unit 13, which displays (13-30) it on the display 60 for selection by the operator. The operator control unit 13 also asks the operator, by a message in the message window on the top left of the display 60, whether the operator wants to make a scan or a print profile. The operator must respond to this by selecting the required function in the left-hand column above key 64A, i.e. in this case "scanner". On this latter selection the selection screen of the chosen function is displayed on the display and the operator can make his settings. If required, he can also use the other sets of parameters, which can be called up with the keys 65A–D.

The operator then again actuates storage key 67 and in response to this the operator control unit 13 sends the user name, function and chosen settings to the JobManager 12, which automatically generates (13-40) a name for the profile, enters (13-60) the profile under that name in its administration system in connection with the user's name and passes the received profile together with the profile name to the JobServer 21 for storage (13-70) in the storage unit 20.

The JobManager 12 then sends the generated profile name to the operator control unit 13, which displays (13-50) it on the display 60, where it subsequently disappears either by the start of a new operation or after expiry of a predetermined interval of time.

The automatically generated file name always has the extension ".pro" and if required can be replaced by a "rename" mechanism from the user's workstation by another more usable name. A standard form can be required, e.g.

"sc_XXXXXX.pro", where XXXXXX has a logical text.

Figure 14:
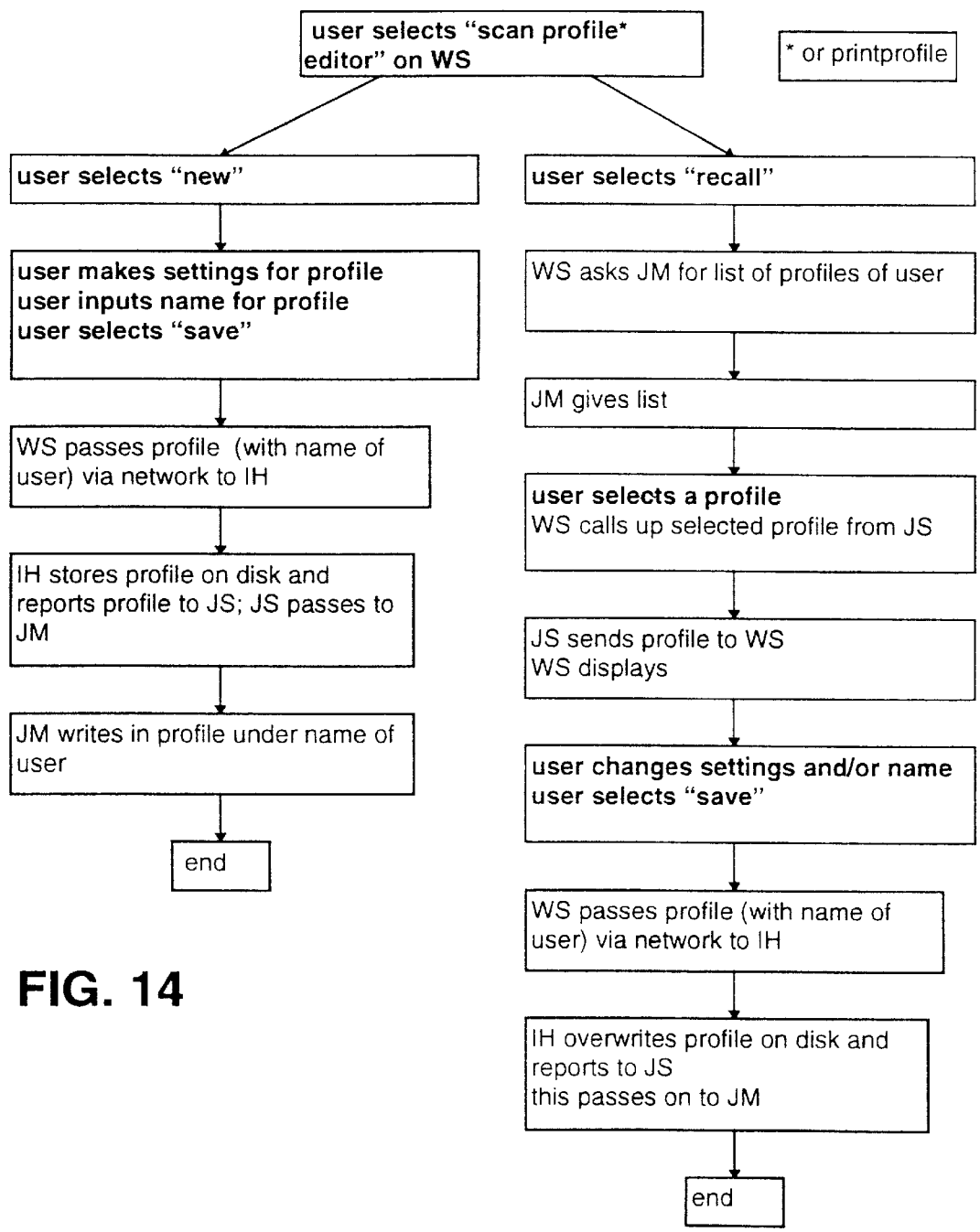

FIG. 14 shows the procedure in making a scan profile or changing an existing scan profile from a workstation. This requires a program specially intended to communicate with the apparatus. This program, which will hereinafter be referred to as the "WS program" has its own user identification and authorization procedure so that the JobManager 12 does not need to repeat this check.

In the WS program a user selects (14-5) a "scan profile editor". Within this subprogram the user can select (14-10) a "new" function, by means of which a new profile is prepared. On the screen at his workstation the user then has a window in which he can set (14-15) all the scan parameters. This can, for example, be an image identical to the image on the display 60 of the apparatus operator control unit 13, with an image of the operator control keys, which can then be operated by means of a cursor, although some other representation can be given.

If the user has made the settings and given a name for the profile, then on his command ("save") the profile is transmitted (14-20) via the network to the InputHandler 15, which stores (14-25) it in the storage unit 20 and reports it to the Jobserver 21. This passes information concerning the profile to the JobManager 12, which enters (14-30) it in its administration system.

The user can also amend an existing scan profile, both in respect of the scan parameter settings and the name. This is possible by selecting (14-35) a "recall" function in the scan profile editor. The WS program then asks (14-40) the JobManager 12 for the scan profiles stored under the name of the relevant user, and the JobManager 12 gives (14-45) an overview, which is then displayed on the workstation screen for selection. After the user has selected (14-50) a specific scan profile, the WS program asks the JobServer 21 for the contents of that profile, and the JobServer 21 brings it from the storage device 20 and sends (14-55) it via the OutputHandler 16, whereafter it is displayed on the workstation screen. The user can now make changes (14-60) and use the "save" command to save them, whereupon the WS program sends (14-65) the new contents of the profile to the apparatus, where it is again stored (14-70) in the storage device 20 and reported to the JobManager 12.

The name of a scan profile always has the extension ".pro".

Fetching a Scan File Using Workstation

Figure 15:
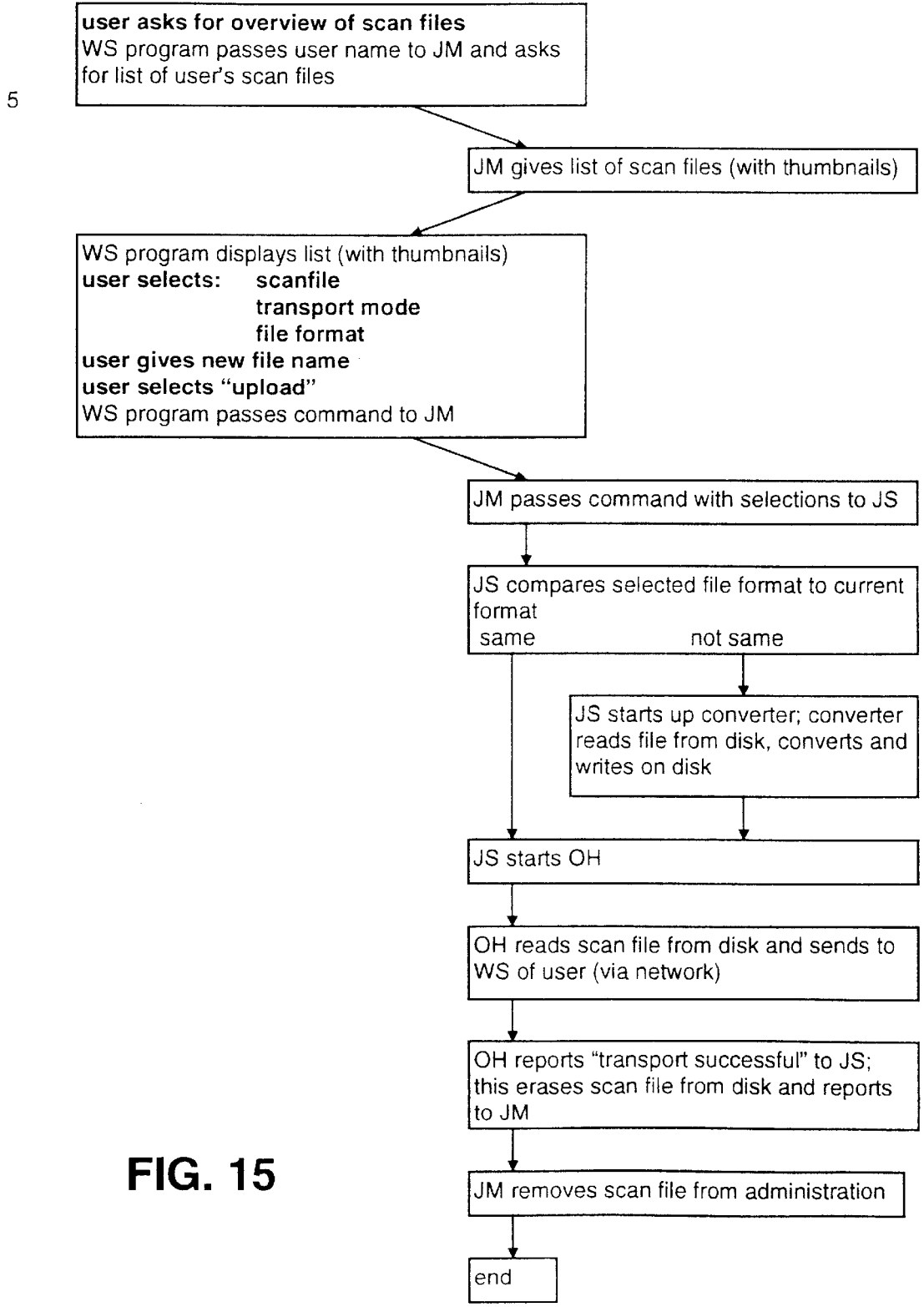
FIG. 15 is a flow diagram of a procedure for fetching a scan profile from the apparatus according to the invention.

FIG. 15 shows the procedure when a user wishes to fetch a scan file stored there under his name, using his workstation.

The WS program for communication with the apparatus is also required for this operation. As already stated, this program is provided with its own user identification and authorization procedure.

In the WS program, the user now selects a presentation function for all the scan files stored under his name in the storage unit 20. The WS program then asks (15-10) for the list of these from the JobManager 12, which compiles the list from its own administration system and sends (15-15) it back. In addition, the JobManager 12 by means of the JobServer 21 and OutputHandler 16 sends to the workstation the thumbnail belonging to each scan file. This can, for example, also be the thumbnail of the first page of a multi-page document.

The WS program now displays (15-20) on the workstation screen the list of scan files with the associated thumbnails for selection by the user. The user is also offered a choice for the transport mode (encrypted or not), the required format of the file, and the name under which the file is to be imported (note that the file still has an automatically generated name which contains no information as to the contents). After making the settings, the user selects the function "upload", whereupon the WS program sends a request to the JobManager 12 to forward the selected file. The JobManager passes (15-30) the order to the JobServer 21, which compares (15-40) the required file format with the current format in which the file is stored in the storage unit 20. If the two formats are different (15-50), the JobServer 21 gives the conversion unit 28 an order to read out the file, convert it, and store it again in the storage unit 20.

The JobServer then starts (15-60) the OutputHandler 16 to transmit (15-70) the file to the workstation. When it has completed its task, it reports (15-80) this to the JobServer 21, which erases the file from the storage unit 20 and passes it on to the JobManager 12, which in turn removes (15-90) the file from its administration system. Alternatively, the scan file can be kept until the user removes it actively.

Print Profile

The use of a profile having previously prepared settings can also be used for interactive printing of print files (described with reference to FIG. 8). In that case, in the step in which the print files are displayed for selection, the profiles, now referred to as print profiles, are also displayed. Prior to selection of a print file, the user can now first select a print profile, whereafter the operator control unit 13 adapts the settings thereto. The user then selects a print file, whereupon everything progresses as already described with reference to FIG. 8. If the user does not select a profile, then the default settings remain operative.

The making and storing of print profiles is completely similar to the making and storing of scan profiles. In this connection reference should be made to the descriptions of FIGS. 13 and 14. A print profile will have the general name "pr_XXXXXX.pro", where XXXXXX has a logical content.

Deferred Copying

A "deferred copying" function is also supported by means of the described embodiments of scanning and printing. In this function an original document or a set of documents is scanned, whereafter the digital image data thus generated are stored in the storage unit 20 under the user's name, and can then, at a later time, be brought up for printing. This progresses as follows.

The function is started by selecting the option "deferred copying" (scan now-print later) in the column above key 64A on the operator control panel. This is then followed by exactly the same procedure as described with reference to FIG. 10 or FIG. 12 for the scanning of documents, in which case the file of generated image data is now so administered by the JobManager that when the interactive print function is called up it is included in the list of files for selection for printing. The process is completed on completion of the scan job.

In order then to print the file, a user should select the option "printer" in the column above key 64A on the operator control panel, in which case as already described the scan files of "deferred copying" jobs are now also displayed for selection in the column above key 64E. The printing process is fully identical to that described with reference to FIG. 8.

In an alternative embodiment, in the case of "deferred printing", after completion of the scanning process the scan file is not stored as an interactive print job, but is added by the JobManager 12 to the print queue for automatic print jobs (AP queue) and automatically printed when it comes to the head of the queue. This embodiment is suitable particularly for situations in which the apparatus is placed in a central reprographic department, in which jobs are processed in a continuous series.

Special Applications

A print file of the second type (IP) can be provided with an extra attribute by the WS program, so that when received in the apparatus according to the invention it is stored in the storage unit 20 under the name of a user other than the sender. In this way, a specific file can also be distributed over a group of users. The recipients, who can be warned by e-mail, then have the opportunity of having the file actually printed for their own use. If required, the recipients can also first bring up the intended print file to their workstation, in exactly the same way as described with reference to FIG. 15 in connection with scan files. After inspection of the file and the decision that it should really be printed, they then send the file, optionally as a file of the first or second type, back to the apparatus for printing there.

The possibility of receiving print files from other users can be programmed for a specific user by means of the JobManager, there being added to the entry of that user in the database of the accounting and security unit 27 a data item which either authorizes the receipt of such files or not. This data item can if required be so extended that it authorizes only the receipt of files from specific other users referred to in the data item, and hence obstructs those of other users.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A digital image reproduction apparatus comprising:
   a scanner unit,
   a printer unit,
   an operator control unit integrated in the apparatus and provided with an input device and a display for a user to give operator control commands to the apparatus,
   a network connection unit for coupling to a network for the purpose of communication with a digital external environment having at least a number of workstations of users,
   a local memory within the apparatus and connected to the network connection unit,
   a management unit connected to the said scanner unit, said printer unit, said local memory and said network connection unit, and, via the network connection unit, to the workstations,
   said management unit maintaining logic storage spaces in said local memory, each allocated to a respective user,
   wherein said management unit, when receiving from one of the user's workstations a digital data file for printing, stores the digital data file in the logic storage space of the relevant user and passes it for printing to said printer unit only on an operator control command from said operator control unit, which operator control command identifies the relevant file,
   wherein, on receipt from the operator control unit of an operator control command for scanning, the command being provided with a user identification, said management unit stores the digital data generated by said scanner unit in executing the command in the logic storage space of the relevant user and passes the digital data generated by said scanner unit to the workstation of the relevant user only on a command from the workstation of the relevant user that identifies the relevant file.

2. The apparatus according to claim 1,
   said operator control unit including:
      means for a user to set print parameters in accordance with which a print order must be executed by said printer unit, and
      means for passing print parameters set by a user, in combination with an identification of the relevant user, to said management unit; and
   said management unit including:
      means for receiving from the workstation print parameters, also in combination with an identification of the user, and
      means for storing the passed and received print parameters in the logic storage space of the relevant user.

3. The apparatus according to claim 2,
   wherein, on a command from the operator control unit, such command specifying a user and a group of print parameters stored in the local memory,
   said management unit reads the group of print parameters out of the logic storage space of the relevant user and transmits to said printer unit for printing a digital data file in accordance therewith.

4. The apparatus according to claim 1,
   said operator control unit including:
      means for a user to set scan parameters in accordance with which a scan order is to be executed by the scanner unit, and
      means for transmitting scan parameters set by a user, in combination with an identification of the relevant user, to said management unit; and
   said management unit including:
      means for receiving scan parameters, also in combination with an identification of a user, from the workstation, and
      means f or storing the passed and received scan parameters in the logic storage space of the relevant user.

5. The apparatus according to claim 4,
   wherein on a command from the operator control unit, such command specifying a user and a group of scan parameters stored in said local memory,
   said management unit reads out the group of scan parameters from the logic storage space of the relevant user and transmits to said scanner unit for scanning a document in accordance therewith and in so doing generating a digital data file.

6. The apparatus according to claim 1,
   wherein said management unit is adapted to pass a digital data file, generated by said scanner unit and stored in the logic storage space of a user in the local memory, to said printer unit for printing only after a command from said operator control unit, which command identifies the relevant data file.

7. The apparatus according to claim 1,
   wherein said management unit manage s a directory s structure in said local memory, the logic storage space s being formed by directories in the directory structure.

8. The apparatus according to claim 1,
   wherein said management unit manages a database in said local memory, the logic storage spaces being formed by entries in the database.

9. A method of reproducing digital images in a digital image reproduction apparatus having a scanner unit, a printer unit, a local memory, an operator control unit integrated in the apparatus and provided with an input device and a display for a user to give operator control commands to the apparatus, a network connection unit connected to the local memory for coupling to a network for the purpose of communication with a digital external environment having at least a number of workstations of users; the method comprising:
   maintaining logic storage spaces in the local memory, each allocated to a respective user,
   storing, upon receipt from one of the user's workstations of a digital data file for printing, the digital data file in the logic storage space of the relevant user, and passing the digital data file to the printer unit only on an operator control command from the operator control unit, which operator control command identifies the relevant file, storing, upon receipt from the operator control unit of an operator control command for scanning, the command being provided with a user identification, the digital data generated by the scanner unit in executing the command in the logic storage space of the relevant user and passing the digital data generated by the scanner unit to the workstation of the relevant user only on a command from the workstation of the relevant user that identifies the relevant file.

10. The method according to claim 9, further comprising:

permitting a user, via the operator control unit, to set print parameters in accordance with which a print order must be executed by said printer unit, passing print parameters set by a user, in combination with an identification of the relevant user, from the workstation to the apparatus, receiving from the workstation print parameters, also in combination with an identification of the user, and storing the passed and received print parameters in the logic storage space of the relevant user.

11. The method according to claim 10, including, on a command from the operator control unit, such command specifying a user and a group of print parameters stored in the local memory, reading the group of print parameters out of the logic storage space of the relevant user and transmitting to the printer unit for printing a digital data file in accordance therewith.

12. The method according to claim 9, further comprising:

permitting a user, via the operator control unit, to set print parameters in accordance with which a scan order must be executed by the scanner unit, transmitting scan parameters set by a user, in combination with an identification of the relevant user, from the workstation to the apparatus, receiving the scan parameters, also in combination with an identification of a user, from the workstation, and storing the transmitted and received scan parameters in the logic storage space of the relevant user.

13. The method according to claim 12, including on a command from the operator control unit, such command specifying a user and a group of scan parameters stored in the local memory, reading out the group of scan parameters from the logic storage space of the relevant user and transmitting to the scanner unit for scanning a document in accordance therewith and in so doing generating a digital data file.

14. The method according to claim 9, including, storing digital data generated by the scanner unit as a digital data file in the logic storage space in the local memory of the relevant user, and passing the stored digital data file to the printer unit for printing only after a command from the operator control unit, which command identifies the relevant data file.

15. The method according to claim 9, further comprising:

managing a directory structure in the local memory, the logic storage spaces being formed by directories in the directory structure.

16. The method according to claim 9, further comprising:

managing a database in the local memory, the logic storage spaces being formed by entries in the database.

* * * * *